May 9, 1950 H. A. BASS 2,507,432
SQUELCH OR MUTING OF AMPLIFIERS
Filed June 11, 1946
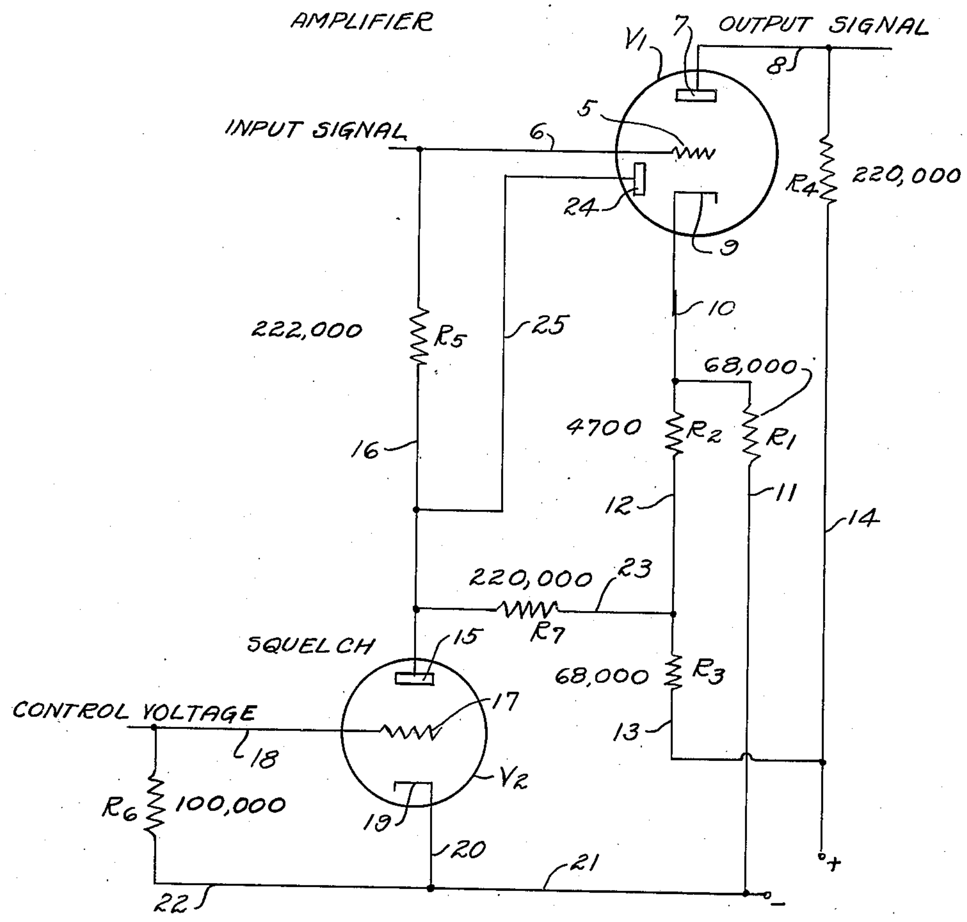
SCHEMATIC - SQUELCH CIRCUIT
INVENTOR.
HARLAND A. BASS
BY [signature] AND
[signature]
ATTORNEYS Patented May 9, 1950 2,507,432

UNITED STATES PATENT OFFICE 2,507,432

SQUELCH OR MUTING OF AMPLIFIERS

Harland A. Bass, Mount Healthy, Ohio, assignor to the United States of America as represented by the Secretary of War Application June 11, 1946, Serial No. 675,871

2 Claims. (Cl. 179—171)

The invention described herein may be manufactured and used by or for the Government for governmental purposes without payment to me of any royalty thereon.

This invention relates to a circuit arrangement including a triode tube for "squelching" or "muting" a one stage amplifier tube in a simple and efficient manner.

In receivers, the incoming signal is amplified to secure a proper reproduction of the signal to operate some device, as a loudspeaker. In the process of tuning a receiver such disturbances, as electric motors, motor control circuits, dial telephones, and the like, ordinarily referred to as "noise" in receivers, encountered between signals will be amplified in like manner as a signal would be amplified, and in those receivers embodying automatic volume control the amplifier is in its most sensitive condition (that is, it has its maximum gain) over those parts of the tuning range of the receiver at which no signal is tuned in and those disturbances or noises may be amplified to such an extent to prove objectionable.

According to the present invention these disadvantages are overcome in which a single stage amplifier for receivers, which may be used in a receiver having automatic volume control, is in circuit with a triode tube arranged to "squelch" or "mute" the amplifier tube to render the receiver mute for all positions between tuned signals. The "squelch tube" controls the negative grid bias of the amplifier tube relative to the cathode thereof to render the amplifier operative or inoperative as the signal is or is not tuned in, respectively. The negative grid bias of the squelch tube is controlled by some small change voltage means, as for example, the voltage variations resulting from the signal detector network through the proper filters, or by some manual voltage control means, if desirable, such that when the receiver is not tuned for any incoming signal the squelch tube is conducting to impress a negative bias on the grid of the amplifier tube sufficient to substantially cut off the amplifier conductivity in order that no noise is reproduced through the receiver to the operated device, as the loud speaker, or the like. Upon the receiver being tuned to an incoming signal the squelch tube becomes non-conducting removing the negative bias from the grid of the amplifier tube allowing the amplifier tube to become conductive to operate in the normal manner. The incorporation of a diode in the amplifier tube operates to prevent the grid of the amplifier tube from becoming positive with respect to the cathode thereof.

It is an object of my invention to control an amplifier stage for a receiver by a "squelching" or "muting" tube for rendering the amplifier inactive when there are no incoming signals and to allow normal operation upon the reception of incoming signals.

It is a further object of my invention to provide a "squelch" tube arranged in circuit with an amplifier tube for a receiver to quiet the amplifier tube, when no signals are being received, by a small percentage of change in control voltage of the squelch tube.

It is a still further object of my invention to connect a single stage vacuum tube amplifier so that the grid bias of this tube is dependent upon the flow of plate current through a "squelch tube" such that when the squelch tube is conducting this bias is sufficiently high to substantially cut off the amplifier stage, the application of a small negative voltage to the grid of the squelch tube causing this bias to decrease until the gain of the amplifier stage has reached a maximum, and any further change of bias is prevented by connecting a diode from the plate of the squelch tube to the cathode of the amplifier stage.

Other objects and advantages will become apparent as the description proceeds by way of example with reference to the accompanying drawing, although it is to be understood that the invention is not limited to the particular embodiment described, in which the single figure is a schematic squelch circuit arranged in accordance with the invention.

In the drawing, a single stage amplifier vacuum tube $V_1$ is shown having a control grid 5 adapted to be connected to an input signal network of a receiver (not shown) through the conductor 6. The anode plate 7 is adapted to be connected through the conductor 8 to a signal reproduction output network (not shown) for a device, as a loudspeaker, or the like. The cathode 9 is connected through the conductor 10 to branch conductors 11 and 12. The conductor 11 is connected to the negative terminal of some direct current supply means, as a B-battery, and includes a resistance $R_1$ while the branch conductor 12 includes a resistance $R_2$ and is connected to the positive terminal of the direct current source through another conductor 13 which includes a resistance $R_3$. The resistances $R_1$, $R_2$ and $R_3$ form a voltage divider from the positive to the negative of the direct current supply source. A conductor 14 connects the positive terminal of the direct current supply source with the anode plate 7 through the resistance $R_4$ providing a plate load for the amplifier tube to develop the amplified signal voltage.

A second tube $V_2$, hereinafter referred to as the "squelch tube," has its anode plate 15 connected to the control grid 5 of the amplifier tube $V_1$ through the conductor 16 which includes a resistance $R_5$. The control grid 17 of the squelch tube $V_2$ is adapted to be connected through a conductor 18 to a voltage controlling means (not shown), as for example, a properly filtered detector incoming signal network, or any other desirable voltage controlling circuit means which may even be manually operated, if expedient. The squelch tube $V_2$ can be operated by a very small percentage of change in voltage on the grid 17 to produce the necessary range of thermionic conductivity of this tube to control the amplifier tube $V_1$. The cathode 19 of the squelch tube $V_2$ is connected to the negative terminal of the direct current supply source by way of conductors 20 and 21. A resistance $R_6$ is connected between the control grid 17 and the cathode 19 of the squelch tube $V_2$ by the conductor 22 to complete the direct current circuit from the grid to the cathode necessary for the proper operation of the tube.

A conductor 23, including a resistance $R_7$ connects the voltage divider at the junction of the conductors 12 and 13 with the conductor 16 at a point adjacent the squelch tube anode plate 15, or in actual practice, on the tube plate terminal.

The amplifier tube $V_1$ is further provided with a diode 9, 24 having its anode plate 24 connected by the conductor 25 to the conductor 16 at a point between the resistance $R_5$ and the juncture of the conductor 23, or in actual practice, with the squelch tube plate terminal.

The resistances are all given values in the drawing for the purpose of illustrating an operative device but other values may be chosen and condensers used in the various circuits, where desirable, without departing from the scope of my invention.

In operation, when the receiver, in which the present invention is used, is tuned to an incoming signal the voltage control means, that is adapted to be connected to the conductor 18, will produce a voltage drop across the resistance $R_6$ which will impress a negative bias on the grid 17 of the squelch tube $V_2$. This negative bias on the grid 17 will render this tube substantially non-conductive at which time the voltage drop across the resistance $R_7$ will be reduced and the anode plate 15 will tend to become positive with respect to the cathode 9 of the amplifier tube $V_1$. The diode elements 9, 24 of tube $V_1$ prevents the grid 5 of the amplifier tube $V_1$ and the anode plate 15 of the squelch tube $V_2$ from actually becoming positive with respect to the cathode 9 of the amplifier tube $V_1$. As the anode plate 15 of the squelch tube $V_2$ tends to become positive with respect to the cathode 9 of the amplifier tube $V_1$ diode current will flow giving a voltage drop across the resistance $R_7$ thereby preventing the anode plate 15 of the squelch tube $V_2$ and the grid 5 of the amplifier tube $V_1$ from becoming sufficiently positive to impair operation. Since the cathode voltage of the amplifier tube $V_1$ is determined by the junction of the resistances $R_1$ and $R_2$ and the grid voltage of the amplifier tube $V_1$ is determined by the plate voltage of the squelch tube $V_2$, the substantially non-conductive condition of the squelch tube $V_2$ will permit the anode 15, and consequently the grid 5, to approach a positive potential with respect to the cathode 9 allowing the amplifier to become conductive to function for amplifying a signal in the normal manner.

When there is no signal tuned in on the receiver, in which this invention is used, there will be substantially no voltage across the resistance $R_6$ eliminating any substantial negative bias to the grid 17 of the squelch tube $V_2$ allowing this squelch tube to be conductive. Upon the squelch tube $V_2$ being conductive a substantial voltage drop will appear across the resistance $R_7$ making the anode plate 15 of the squelch tube $V_2$ negative with respect to the junction of the resistances $R_2$ and $R_3$ by an amount to impress a sufficiently negative bias on the grid 5 of the amplifier tube $V_1$ to substantially cut off any amplification. This condition renders the amplifier tube $V_1$ substantially mute such that any incoming noise will not be reproduced on the output reproduction signal network.

A noise coming into the receiver where the grid 17 of the squelch tube $V_2$ is connected to the input signal network, will not operate in the squelch circuit to produce amplification since the amplitude of the direct current component of any noise will not be sufficient to bais the grid 17 of the squelch tube $V_2$ sufficiently for causing operation of the amplifier tube $V_1$ to function to amplify the noise.

While this invention is illustrated in the use of a single amplifier stage it is to be understood that it is not limited to single stage amplifiers but may be put into effect with any number of amplifiers.

I claim:

1. In a squelch or muting circuit of a receiver for rendering an amplifier stage mute in the absence of an incoming signal comprising; a signal transmission amplifier tube having a grid adapted to be connected to a signal input network, an anode connected through a resistance to the positive terminal of a direct current supply source and further adapted to be connected to a signal reproduction output network, and a cathode tapped on a voltage divider connected across said direct current supply source; a squelch tube having a cathode in electrical communication with the negative terminal of said direct current supply source, a grid connected through a resistance to the cathode thereof and further adapted to be connected to a voltage control means for producing a voltage differential across the grid-to-cathode resistance in accordance with the voltage impressed by said voltage control means, and an anode connected to branch conductors each branch of which includes a resistance, one branch conductor being connected to the grid of said amplifier tube and the other branch conductor being connected to said voltage divider at a tap providing a higher potential than the tap of said amplifier tube cathode; and a second anode in said amplifier tube forming a diode, said squelch tube anode and the diode anode being directly connected for conducting diode current to produce a voltage drop across said resistance in said other branch conductor of said squelch tube anode when said last mentioned anode and said amplifier tube grid tend to become positive with respect to the amplifier cathode potential whereby a negative bias placed on the grid of said squelch tube renders said squelch tube substantially non-conductive and said amplifier tube conductive to amplify any signals for the reproduction output network, and a reduction of the negative bias on the grid of said squelch tube will render said squelch tube conductive and said amplifier tube substantially non-conductive, the diode preventing the grid of said amplifier tube from becoming positive with respect to the cathode thereof.

2. In a squelch or muting circuit of a receiver for rendering an amplifier stage mute in the absence of an incoming signal wherein the amplifier stage is a diode-triode tube having a triode anode connected through one branch conductor to the positive terminal of a direct current source through a load resistor and adapted to be coupled through another branch conductor to a signal reproduction output network, a cathode coupled to a tap on a voltage divider connected across the direct current source, a grid adapted to be coupled to a signal input circuit, and a diode anode, the improvement which comprises; a squelch triode tube having an anode connected through one branch conductor including a resistance to the grid of said diode-triode amplifier tube, through a second branch conductor including a resistance to a tap on said voltage divider of higher potential than the cathode and of lower potential than the triode anode of said diode-triode amplifier tube, and through a third branch conductor directly to said diode anode, a cathode in said squelch triode tube being connected directly to the negative terminal of said direct current source, and a grid in said squelch triode tube being connected through one branch conductor including a resistance to the cathode thereof and adapted to be connected through another branch conductor to the signal input circuit whereby a small percentage change in signal voltage to produce a voltage drop across the grid-to-cathode resistance establishing a negative bias on the grid of said squelch triode tube will render said squelch triode tube substantially non-conductive and said diode-triode amplifier tube conductive to amplify the signal, said diode of the diode-triode amplifier tube preventing the grid thereof from becoming positive with respect to the cathode thereof by becoming conductive to produce a voltage drop across the resistance in said second branch conductor of said squelch triode tube anode, and the reduction of the negative bias on the grid of said squelch triode tube will render said squelch triode tube conductive and said diode-triode amplifier tube substantially non-conductive.

HARLAND A. BASS.

REFERENCES CITED

The following references are of record in the file of this patent:

UNITED STATES PATENTS

| Number | Name | Date |
|---|---|---|
| 2,179,966 | Sturley | Nov. 14, 1939 |
| 2,210,413 | Jones | Aug. 6, 1940 |
| 2,237,661 | Ernst | Apr. 8, 1941 |
| 2,372,934 | Campbell | Apr. 3, 1945 |
| 2,400,948 | Peterson | May 28, 1946 |
| 2,405,845 | Pfaff | Aug. 13, 1946 |